United States Patent
Petit

(10) Patent No.: US 11,498,459 B2
(45) Date of Patent: Nov. 15, 2022

(54) RAIL FOR VEHICLE SEAT AND VEHICLE SEAT COMPRISING SUCH A RAIL

(71) Applicant: FAURECIA Sièges d'Automobile, Nanterre (FR)

(72) Inventor: Fabrice Petit, Saint Georges des Groseillers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 307 days.

(21) Appl. No.: 16/731,192

(22) Filed: Dec. 31, 2019

(65) Prior Publication Data

US 2020/0207242 A1 Jul. 2, 2020

(30) Foreign Application Priority Data

Jan. 2, 2019 (FR) ..................................... 19 00015

(51) Int. Cl.
*B60N 2/08* (2006.01)
*B60N 2/02* (2006.01)
*B60N 2/06* (2006.01)

(52) U.S. Cl.
CPC ......... *B60N 2/0881* (2013.01); *B60N 2/0232* (2013.01); *B60N 2/0276* (2013.01); *B60N 2/067* (2013.01)

(58) Field of Classification Search
CPC .. B60N 2/0881; B60N 2/0232; B60N 2/0276; B60N 2/067; B60N 2/0155; B60N 2/02; B60N 2/04; B60N 2/06; B60N 2/07; B60N 2/0727; B60N 2/08; B60N 2/0806; B60N 2/0812; B60N 2/0818; B60N 2/0837; B60N 2/085; B60N 2/42; B60N 2/427; B60N 2/43; B60N 2/433

USPC ....................................................... 297/216.1
See application file for complete search history.

(56) References Cited

U.S. PATENT DOCUMENTS

| | | | | |
|---|---|---|---|---|
| 4,225,184 A * | 9/1980 | Strowick | ................. | B60R 22/26 248/393 |
| 4,534,534 A * | 8/1985 | Hess | .................... | B60N 2/0232 248/424 |
| 5,125,611 A * | 6/1992 | Cox | ...................... | B60N 2/0232 248/420 |
| 5,586,740 A * | 12/1996 | Borlinghaus | ........ | B60N 2/0232 248/157 |
| 7,077,471 B2 * | 7/2006 | Schumann | ........... | B60N 2/1685 296/68.1 |
| 9,827,879 B2 * | 11/2017 | Fujita | ................... | B60N 2/0881 |

(Continued)

FOREIGN PATENT DOCUMENTS

| | | |
|---|---|---|
| DE | 29506566 U1 | 7/1995 |
| DE | 10046204 A1 * | 6/2002 ............... B60N 2/08 |

(Continued)

OTHER PUBLICATIONS

Machine Translation of DE-10046204-A1, Strubel Peter.*
French Search Report for French App. No FR1900015 dated Nov. 21, 2019, 10 pages, (no English translation available).

*Primary Examiner* — Nkeisha Smith
(74) *Attorney, Agent, or Firm* — Barnes & Thornburg LLP

(57) ABSTRACT

A rail for a vehicle seat having first and second sliding rail members driven by a motorized drive mechanism. The rail further comprises a mechanical lock actuated by a relative movement between the motorized drive mechanism and the second rail member in the event of an accident.

10 Claims, 6 Drawing Sheets

(56) References Cited

U.S. PATENT DOCUMENTS

| | | | | |
|---|---|---|---|---|
| 2004/0026975 A1* | 2/2004 | Rausch | ............... | B60N 2/0875 |
| | | | | 297/344.1 |
| 2004/0217251 A1* | 11/2004 | Leguede | ................. | B60N 2/08 |
| | | | | 248/424 |
| 2012/0019037 A1* | 1/2012 | Rohnert | ............... | B60N 2/0831 |
| | | | | 297/378.1 |
| 2014/0239689 A1* | 8/2014 | Schebaum | ............... | B60N 2/08 |
| | | | | 297/341 |
| 2017/0240067 A1* | 8/2017 | Stutika | ................. | B60N 2/0818 |
| 2019/0070981 A1* | 3/2019 | Jakubowicz | ........... | B60N 2/929 |
| 2019/0193595 A1* | 6/2019 | Jang | .................... | B60N 2/0875 |

FOREIGN PATENT DOCUMENTS

| | | |
|---|---|---|
| DE | 10046204 A1 | 6/2002 |
| JP | 2016215931 A | 12/2016 |

* cited by examiner

RAIL FOR VEHICLE SEAT AND VEHICLE SEAT COMPRISING SUCH A RAIL

PRIORITY CLAIM

This application claims priority to French Application No. FR19 00015, filed Jan. 2, 2019, which is expressly incorporated by reference herein.

BACKGROUND

The present disclosure relates to rails for vehicle seats and to vehicle seats comprising such rails. More particularly, the present disclosure relates to a rail for a vehicle seat comprising first and second rail members mounted so as to slide relative to one another in a longitudinal direction, the rail having a motorized drive mechanism.

SUMMARY

According to the present disclosure, a rail for a vehicle seat, comprises a first rail member and a second rail member mounted so as to slide relative to one another in a longitudinal direction.

In illustrative embodiments, the rail further comprises a motorized drive mechanism adapted for selectively either immobilizing or driving the second rail member relative to the first rail member, the second rail member being mounted so as to move relative to the motorized drive mechanism such that it is normally retained in a neutral position with respect to the motorized drive mechanism and the second rail member being movable from the neutral position when the second rail member is subjected to a force greater than a predetermined threshold in the longitudinal direction, at least one mechanical lock mounted on the second rail member and movable between an unlocked position where the lock allows the first and second rail members to move freely relative to one another in the longitudinal direction, and a locked position where the lock immobilizes the first and second rail members relative to one another, the lock normally being held in the unlocked position, and a lock control member mounted on the second rail member, the lock control member being connected to the motorized drive mechanism such that the lock control member is either in a home position where the lock control member allows the lock to be in the unlocked position when the second rail member is in neutral position with respect to the motorized drive mechanism or in an actuation position where the lock control member controls the lock to move the lock into the locked position when the second rail member is moved from the neutral position with respect to the motorized drive mechanism.

In illustrative embodiments, the rail is securely locked by the lock in case of impact to the vehicle, and this is so regardless of the dimensions and/or material of the motorized drive mechanism.

In illustrative embodiments, one or more of the following arrangements may possibly be used with rail:

the motorized drive mechanism comprises a driving device adapted to drive a pinion engaged with a rack that is part of the first rail member, the second rail member being mounted so as to slide in the longitudinal direction relative to the driving device;

the driving device cooperates with the lock control member by camming action to move the lock control member into actuation position when the second rail member is moved from the neutral position with respect to the motorized drive mechanism;

the lock control member comprises a cam edge and the driving device comprises a pin which cooperates with the cam edge, the lock control member being movable substantially perpendicularly to the cam edge and being resiliently biased so that the cam edge is applied against the pin;

the cam edge has a notch adapted to engage the pin when the second rail member is in a neutral position with respect to the motorized drive mechanism;

the cam edge comprises two substantially rectilinear portions that are in mutual alignment, one on each side of the notch;

the pin is mounted so as to slide in a slot that is part of the second rail member and extending in the longitudinal direction;

the pin is pivotally mounted in the rail and a retaining lever, which is integral with the driving device, is resiliently biased towards the rack so as to urge the pinion against the rack;

the lock control member is mounted so as to pivot relative to the second rail member about a pivot axis, and the retaining lever is resiliently biased towards the rack by a spring acting on a retaining cam mounted on the second rail member so as to pivot about the pivot axis, the spring connecting the retaining cam to the lock control member while biasing the lock control member towards the home position;

the lock control member extends longitudinally between a first end and a second end, the first end being mounted on the second rail member so as to pivot about the pivot axis and the second end being connected to the lock, the cam edge being located between the first end and the second end;

In illustrative embodiments, the lock comprises: a lock body mounted so as to move between the locked position and the unlocked position along a transverse direction perpendicular to the longitudinal direction, and a plurality of locking pistons mounted so as to slide independently of each other on the lock body in the transverse direction, the locking pistons being mutually aligned in the longitudinal direction and adapted to penetrate recesses that are part of the first rail member when the lock is in the locked position, each locking piston being biased towards the recesses of the first rail member.

In illustrative embodiments, a vehicle seat comprises two rails as described above and a seating portion carried by the second rail member of each rail. Each rail may comprise a motorized drive mechanism of its own, which avoids cluttering up the space under the seat with a motor and mechanical transmission means.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements.

Figure 1:
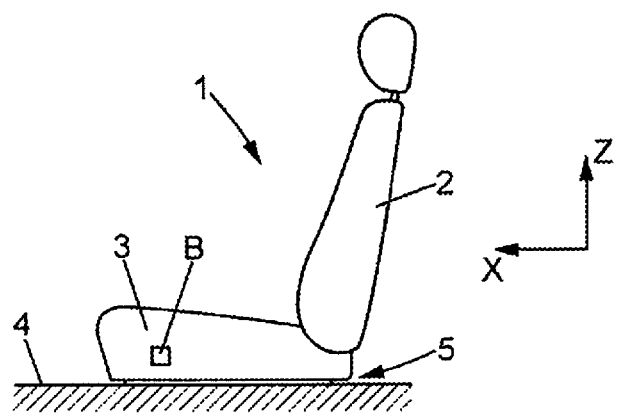
FIG. 1 is a schematic side view of a seat that may include rails according to the present disclosure.
Figure 2:
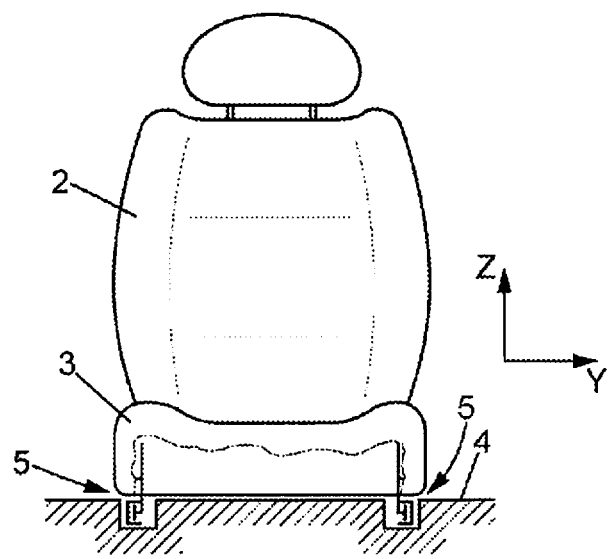
FIG. 2 is a schematic front view of a seat that may include rails according to the present disclosure.

FIGS. 1 and 2 show a motor vehicle seat 1 which comprises a backrest 2 carried by a seating portion 3 which itself is mounted on the floor 4 of the vehicle so as to slide in a substantially horizontal longitudinal direction X.

The seating portion 3 is connected to the floor 4 by two parallel rails 5 extending in the longitudinal direction X.

Each of the rails 5 comprises an electric, motorized drive mechanism which will be described hereinafter, the motorized drive mechanisms of the two rails 5 being synchronously controlled by a central processing unit (for example, a microcontroller or the like) according to commands received in particular from a bi-directional control button B or similar device operable by a user.

Figure 3:
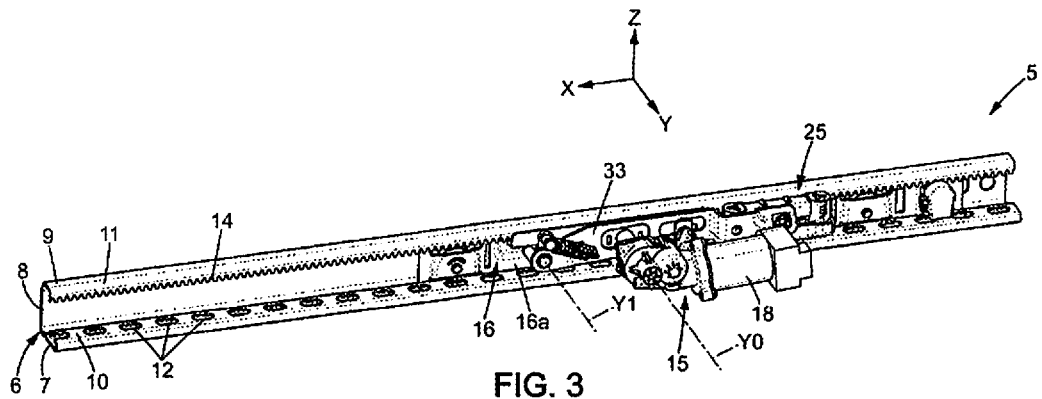
FIG. 3 is a perspective view of one of the rails of the seat of FIGS. 1 and 2.

As shown in FIG. 3, each rail 5 comprises a first rail member 6 and a second rail member 16 mounted on the first rail member 6 so as to slide in the longitudinal direction X. One of these first and second rail members is connected to the floor 4 of the vehicle, the other to the seating portion 3. In the example shown, the first rail member 6 is integral with the floor 4 and the second rail member 16 is integral with the seating portion, but the opposite is possible.

The first rail member 6 may in general be a section, for example, a metal section, and the second rail member 16 may also comprise a movable section 16a, in particular a metal section, or some other rigid element, slidably mounted on the first rail member 6.

The first rail member 6 of each rail 5 may for example have the shape of C that opens horizontally towards the other rail 5 of the seat.

The first rail member 6 may comprise for example: a lower flange 7 extending substantially horizontally parallel to the longitudinal direction X and to a transverse horizontal direction Y perpendicular to the longitudinal direction X, a web 8 extending upwards (parallel to the longitudinal direction X and substantially in a vertical direction Z) from the outer edge of the lower flange, and an upper flange 9 extending substantially horizontally to the lower flange 7, from the upper edge of the web 8.

The free edge of the lower flange 7 may comprise a bend 10 folded, for example, substantially 180 degrees towards the web 8 and forming an inner groove.

The free edge of the upper flange 9 may comprise a bend 11 to extend downwards.

The lower flange 7 may comprise indentations, for example, holes 12, aligned along the longitudinal direction X at a regular pitch.

The bend 11 of the upper flange 9 may have a lower free edge cut to form a rack 14.

The motorized drive mechanism 15 may comprise for example a driving device 18 mounted on the second rail member 16. The driving device 18 may for example be a gear motor or the like, driving for example a pinion 19 in rotation about an axis of rotation Y0 parallel to the transverse direction Y (see FIG. 9 in particular). The pinion 19 is engaged with the rack 14.

Figure 4:
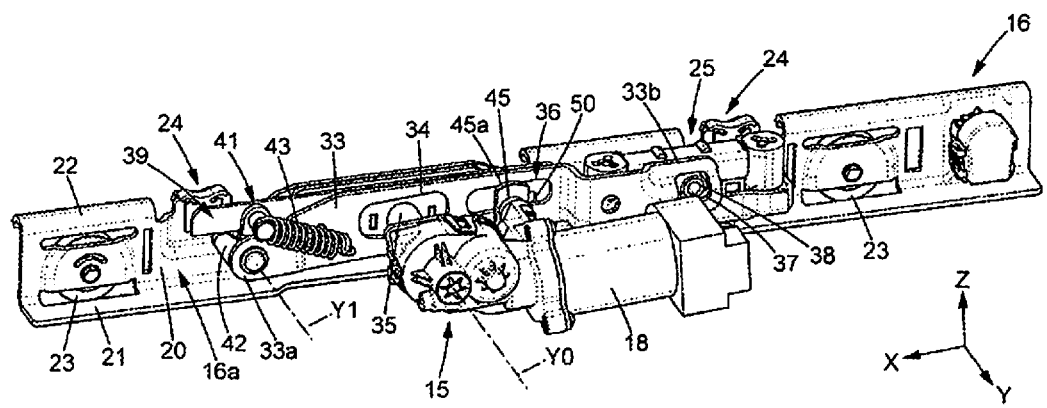
FIG. 4 is a perspective view of the movable section of the rail in the normal position of use, in a three-quarter view from above.
Figure 5:
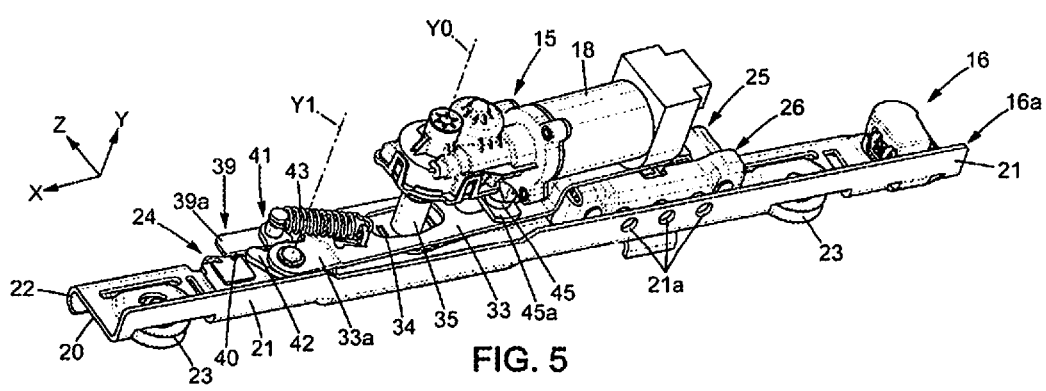
FIG. 5 is a perspective view of the movable section of the rail in the normal position of use, in a three-quarter view from below.
Figure 6:
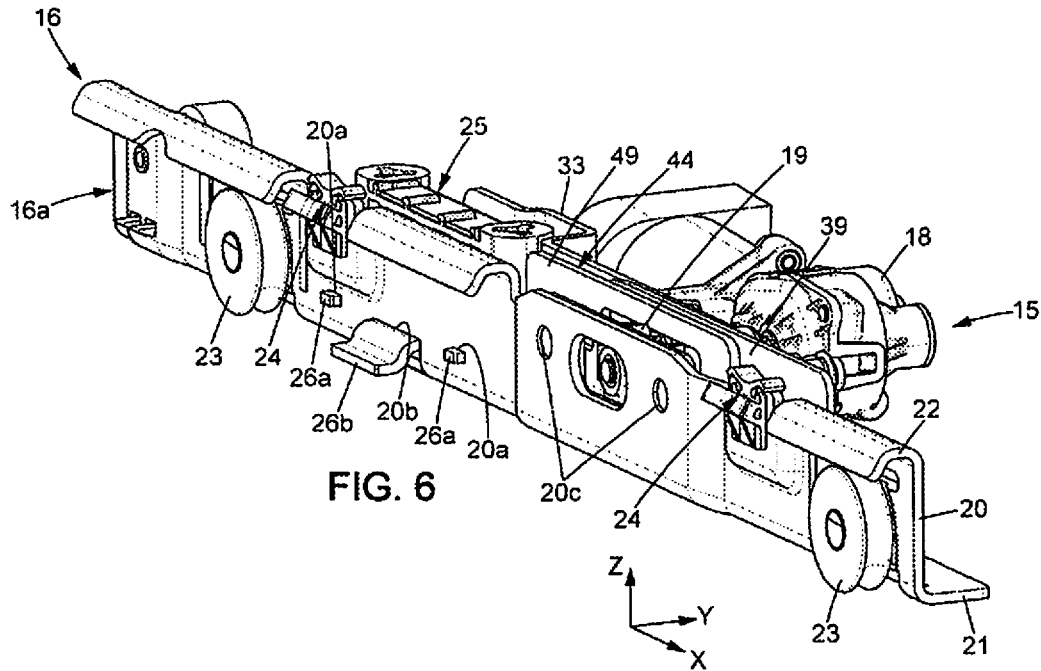
FIG. 6 is a perspective view of the second rail member in the normal position of use, without the retaining lever which biases the pinion of the motorized driving device towards the rack, viewed from the opposite side in comparison to FIGS. 4 and 5.

As shown in FIGS. 4 to 6, the movable section 16a may comprise: a vertical web 20 adjacent to the web 8 of the fixed section, a lower flange 21 arranged above the lower flange 7 of the first rail member 6, in the groove defined between the lower flange 7 and the bend 10 of the first rail member 6, and an upper flange 22 arranged below the upper flange 9 of the first rail member 6.

The movable section 16a may comprise rollers 23 rolling on the inner surface of the lower flange 7 of the first rail member 6 to allow longitudinal sliding of the movable section 16. The movable section 16a may further comprise pads for sliding 24 which come to bear against the underside of the upper flange 9 of the first rail member 6, between the web 8 and the folded edge 11 of the first rail member 6.

The rail 5 further comprises at least one mechanical lock 25 movable between an unlocked position where the lock 25 allows the second rail member 16 to slide freely in the longitudinal direction X, and a locked position where the lock 25 immobilizes the second rail member 16 on the first rail member 6, the lock 25 normally being maintained in the unlocked position.

The lock 25 may be mounted so as to be movable on the second rail member 16 perpendicularly to the longitudinal direction X, for example in the vertical direction Z.

In the example shown in the drawings, the second rail member 16 comprises a lock support 26, for example of metal, which is clearly visible in FIGS. 6 and 8 to 10 and which carries the lock 25. The lock support may, for example, be cut and stamped sheet metal. The lock support 26 is made integral to the movable section 16a by any known means, for example by tabs 26a, 26b fitted into recesses 20a, 20b of the web 20 of the movable section 16a.

The lock 25 may comprise a lock body 27 which is mounted so as to slide on two prongs 28 integral with the lock support 26, these prongs extending for example in the vertical direction Z. The lock body 27 is resiliently biased towards the unlocked position (in this case upwards), for example by two coil springs 29 respectively arranged around the prongs 28.

The lock 25 may further comprise a plurality of locking pistons 30 which slide independently of one another in the lock body 27 along the vertical direction Z. The locking pistons 30 may for example be three in number. The locking pistons 30 are mutually aligned in the longitudinal direction X.

The locking pistons 30 may each comprise an enlarged head 30a slidably mounted in a cylinder 31 having a central axis parallel to the vertical direction Z, formed in the lock body 27. Each locking piston 30 extends towards the web 10 of the first rail member 6, in this case vertically downwards, passing through an opening 31a at the base of the corresponding cylinder 31. The opening 31a is too narrow to allow the enlarged head 30a of the locking piston 30 to pass through, so the locking piston cannot be detached from the lock body 27.

Each locking piston 30 is resiliently biased downward, independently of the others, by a spring 32 arranged in the corresponding cylinder 31. Each locking piston 30 is further arranged facing a hole 21a formed in the lower flange 21 of the movable section 16a. The locking piston 30 may be a right circular cylinder and the hole 21a may be circular of substantially the same diameter as the locking piston 30.

The locking pistons 30 are arranged above the holes 12 of the folded edge 10 of the first rail member 6 such that, regardless of the position of the second rail member 16 along the X axis, at least one (or even two) locking pistons 30 can enter a hole 12 of the folded edge 10 and into the hole 21a corresponding to the locking piston 30, the moment the lock body 27 descends to the locked position. The holes 12 may be oblong and aligned in the longitudinal direction to facilitate this instant locking.

As shown in particular in FIGS. 4 to 8, the rail 5 further comprises a lock control member 33 mounted on the second rail member 16. The lock control member 33 is movable between a home position where the lock control member 33 permits the lock 25 to be in the unlocked position and an actuation position where the lock control member 33 controls the lock 25 to move the lock 25 into the locked position.

Figure 7:
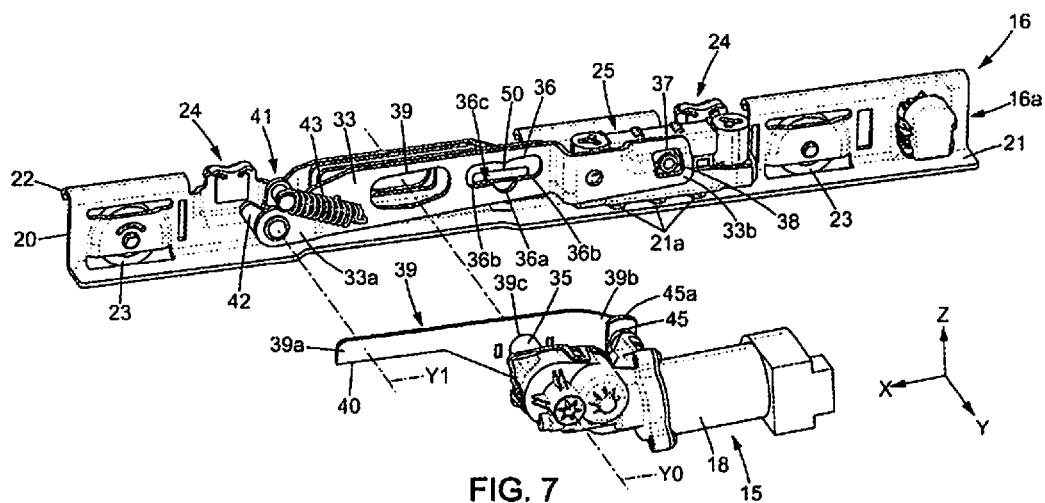
FIG. 7 is an exploded view similar to FIG. 4, with the motorized driving device and its retaining lever detached from the rail member.

The lock control member 33, which is visible in FIG. 7 in particular, may be for example a part of sheet metal extending substantially in the longitudinal direction X between a first end 33a and a second end 33b. The lock control member 33 may in particular be mounted so as to pivot relative to the second rail member 16 about a pivot axis Y1 parallel to the transverse direction Y.

The lock control member 33 may comprise a window 34 traversed by a sleeve 35 integral with the driving device 18, allowing relative movements between the lock control member 33 and the driving device 18 in the longitudinal direction X and in the vertical direction Z.

The lock control member 33 may further comprise a slot 36 which extends substantially in the longitudinal direction X and has a cam edge 36c (in the current case the lower edge of the slot 36) which comprises a central downward notch 36a, separated by two straight portions 36b extending opposite one another from the notch 36a.

The lock control member 33 may further comprise, at its second end 33b, an opening 37 in which is engaged a pin 38 integral with the lock body 27, such that a pivoting of the lock control member 33 about pivot axis Y1 causes vertical movement of the lock 25.

Figure 9:
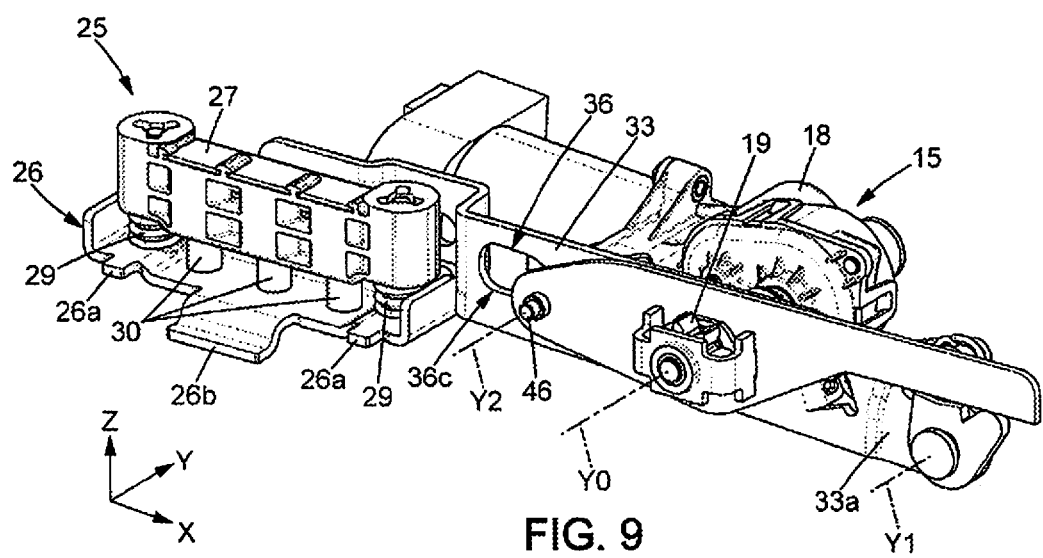
FIG. 9 is a perspective view similar to FIG. 8, without the lock control member support.

The rail 5 further comprises a retaining lever 39 which is visible in FIGS. 7 and 9. The retaining lever extends substantially parallel to the lock control member 33, between a first end 39a near the first end 33a of the lock control member 33 and a second end 39b integral with the driving device 18 as will be explained below. The retaining lever 39 further comprises a recess 39c which is traversed without clearance by the aforementioned sleeve 35 that is part of the driving device 18. The retaining lever may be formed in particular of sheet metal.

The first end 39a of the retaining lever 39 is free and has a lower edge 42.

The rail 5 may further comprise a lever 41 mounted so as to pivot on pivot axis Y1 relative to the second rail member 16. The lever 41 is integral with an arm forming a retaining cam 42 acting upwardly against the lower edge 40 of the retaining lever, under the effect of a spring 43 mounted between the lever 41 and the lock control member 33. The spring 43 also urges the lock control member 33 to pivot upwards.

The second rail member 16 may further comprise a motor support 44 which may for example be a metal section which extends in the longitudinal direction X and which has a U-shaped cross-section, with a first vertical flange 47 distanced from the driving device 18, a second vertical flange 49 closer to the driving device 18, and a lower horizontal web 48 connecting the first flange 47 and the second flange 49. The first flange 47 may comprise for example pins 47a or other protruding shapes, engaged in corresponding recesses 20c of the web 20 of the movable section 16a (see FIGS. 6 and 8).

The second flange 47 of the engine support 44 may comprise an extension 49a on which the lock control member 33 and the lever 41 are mounted so as to pivot about pivot axis Y1.

Figure 8:
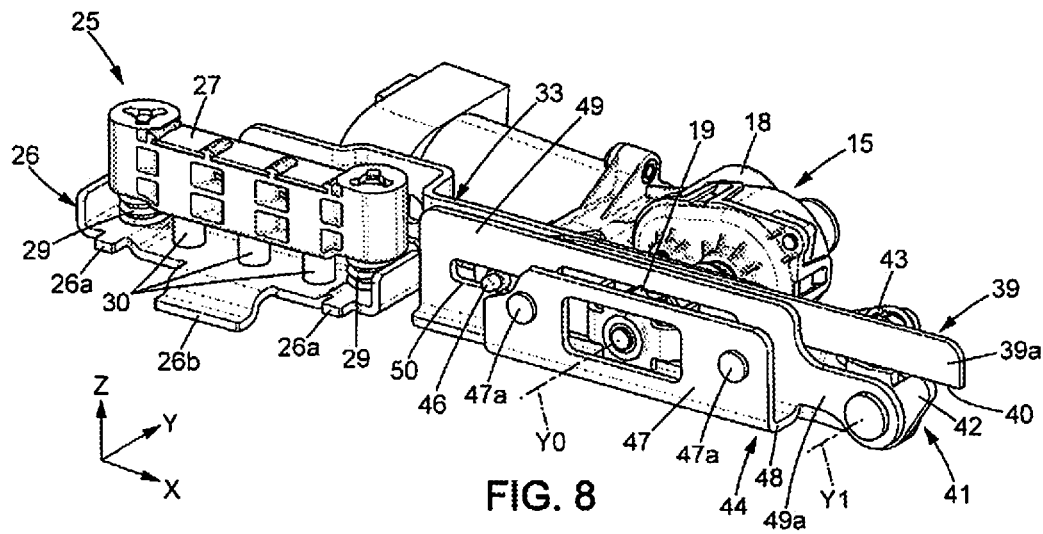
FIG. 8 is a partial perspective view similar to FIG. 6, showing only the motorized driving device and its retaining lever, a lock control member, a lock control member support, a lock and its support.
Figure 10:
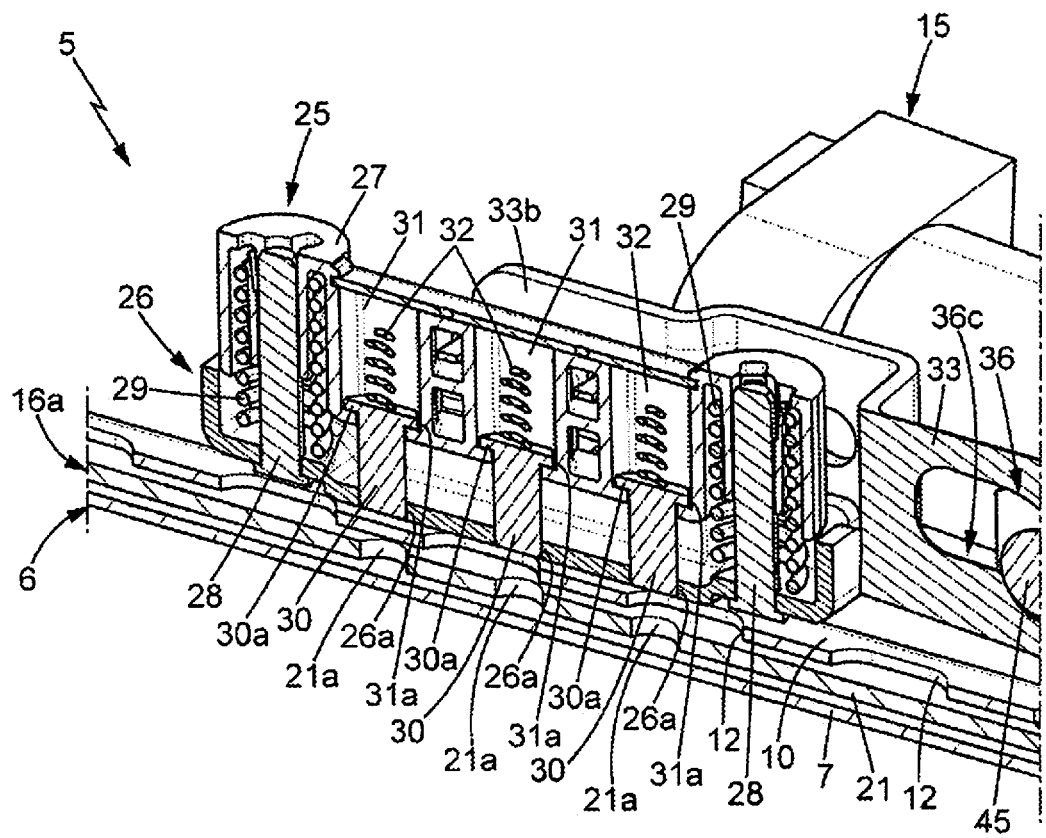
FIG. 10 is a vertical longitudinal sectional view of the lock, in the position of use.
Figure 11:
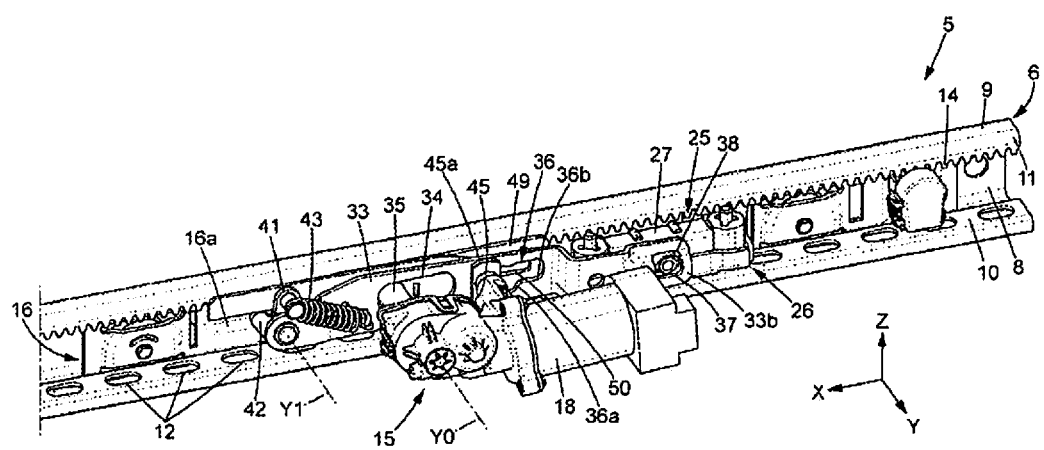
FIG. 11 is a view similar to FIG. 3 but enlarged, in the locked position.
Figure 12:
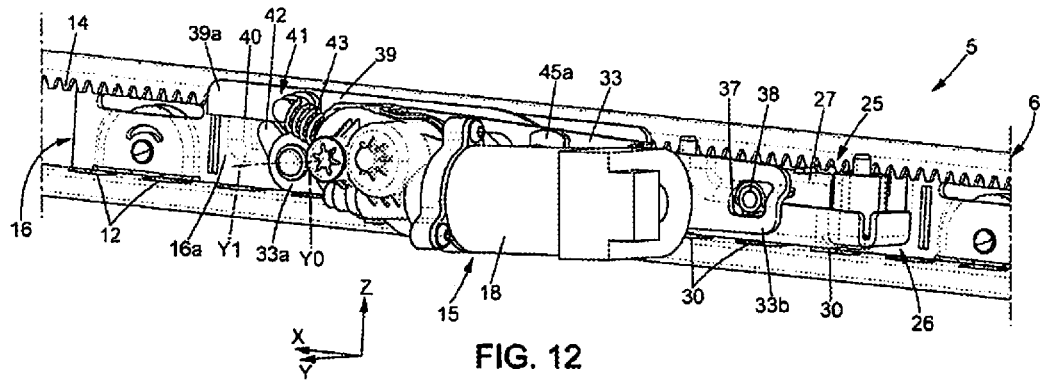
FIG. 12 is a view similar to FIG. 11 but further enlarged and viewed from another angle.
Figure 13:
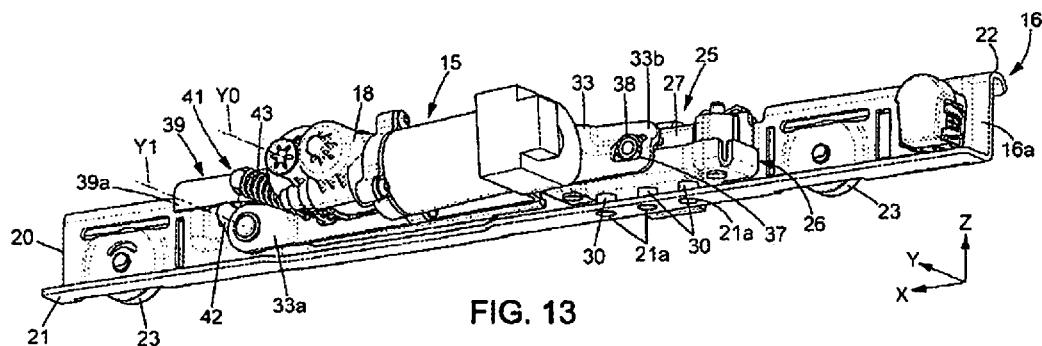
FIG. 13 shows the second rail member in a three-quarter view from below, in the locked position.

The second flange 47 of the motor support 44 may comprise a guide slot 50 parallel to the longitudinal direction X, in which is engaged a circular head 46 integral with a pin 45 that is part of the driving device (see FIGS. 8, 9, 10). The head 46 of the pin 45 is integral with the second end 39b of the retaining lever 39. The mounting of the head 46 in the slot 50 allows both a relative sliding between the second rail member 16 and the driving device 18, and a pivoting of the driving device 18 with the retaining lever 39 about pivot axis Y2.

Because of the free pivoting about axis Y2, the pinion 19 is kept in engagement with the rack 14, under the effect of the biasing by the spring 43 and the retaining cam 42.

The pin 45 of the driving device 18 is engaged in the slot 36 of the lock control member and is normally held in the notch 36a of this slot 36 by the upward pivoting bias exerted by the spring 43 on the lock control member 33. The pin 45 may be integral to a guide plate 45a parallel to the lock control member 33 and may bear against the face of the lock control member 33 oriented towards the driving device 18, above and below the slot 36.

Figure 14:
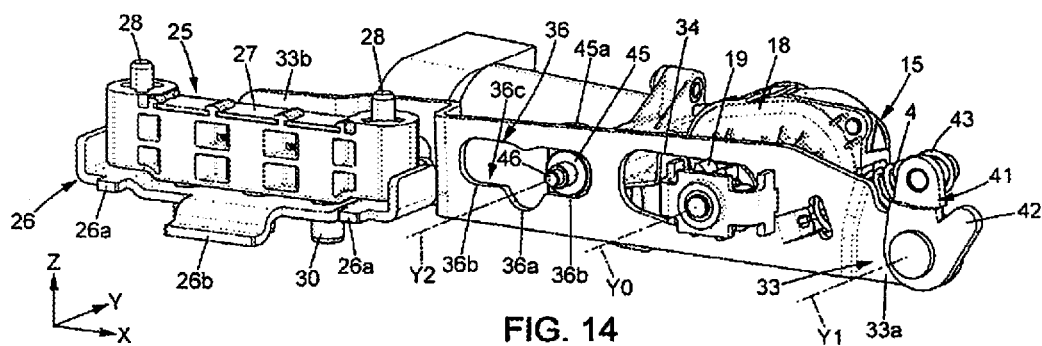
FIG. 14 is a view similar to FIG. 9, without the retaining lever for the pinion and in the locked position.

When the vehicle in which the seat is installed is subjected to a front or rear impact, the seating portion of the seat transmits to the movable section 16a considerable force parallel to the longitudinal direction X. When this force is greater than a certain threshold, for example between 0.7 kN and 5 kN, the force of the spring 43 is no longer sufficient to keep the pin 45 in the notch 36a. The movable section 16a then slides in the longitudinal direction X, with the lock control member 33, relative to the driving device 18 which remains secured to the first rail member 6 by the engagement of the pinion 19 in the rack 14. This movement causes a relative displacement between the pin 45 and the slot 36, such that the pin 45 exits the notch 36a and reaches one of the straight portions 36b of the slot 36 (FIG. 14). This movement pivots the lock control member 33 downwardly by camming action between the pin and the cam edge formed by the lower edge of the slot 36. As a result, the lock control member 33 lowers the lock body 27 to the locked position, and at least one of the locking pistons 30 engages in one of the holes 12 of the first rail member 6, thus ensuring a mechanical locking which reinforces the engagement between the pinion 19 and the rack 14 (FIGS. 11 to 14).

The cam edge 36c might not be formed in a slot. In addition, it could be possible to ensure that the lock 25 is actuated only in the event of a front impact, in which case the cam edge 36c could comprise the notch 36a and a single rectilinear portion 36b towards the rear of the notch 36a. Finally, the portions 36b could be non-rectilinear, without this modifying the operation of the present disclosure.

After the impact, the rail can return to the normal position of use by actuation of the driving device to compensate for the relative movement between the movable section 16a and the driving device 18 which occurred during the impact. This compensatory movement may possibly be controlled automatically, particularly if the rail is equipped with a position sensor capable of measuring the position of the movable profile 16a with respect to the first rail member 6.

The space under the seating portion 3 of the seat is not cluttered up with any motor between the rails 5 for controlling the rails, which allows either taking full advantage of this free space, or lowering the seat 1 with respect to the floor 4 of the vehicle.

One example of a motorized rail is that the mechanical strength of the rail in the event of a vehicle accident is determined by the strength of the motorized drive mechanism. As a result, this may cause the use of a drive mechanism that is substantially metal, therefore heavy, expensive, and possibly noisy when subjected to vibrations from the operation of the vehicle.

The invention claimed is:

1. A rail for a vehicle seat, the rail comprising
   a first rail member and a second rail member, mounted so as to slide relative to one another in a longitudinal direction,
   a motorized drive mechanism adapted for selectively either immobilizing or driving the second rail member relative to the first rail member, the second rail member being mounted so as to move relative to the motorized drive mechanism such that it is normally retained in a neutral position with respect to the motorized drive mechanism and the second rail member being movable from the neutral position when the second rail member is subjected to a force greater than a predetermined threshold in the longitudinal direction,
   at least one mechanical lock mounted on the second rail member and movable between an unlocked position where the lock allows the first rail member and second rail member to move freely relative to one another in the longitudinal direction, and a locked position where the lock immobilizes the first rail member and second rail member relative to one another, the lock normally being held in the unlocked position,
   and a lock control member mounted on the second rail member, the lock control member being connected to the motorized drive mechanism such that the lock control member is either:
      in a home position where the lock control member allows the mechanical lock to be in the unlocked position when the second rail member is in the neutral position with respect to the motorized drive mechanism, or
      in an actuation position where the lock control member controls the lock to move the lock into the locked position when the second rail member is moved from the neutral position with respect to the motorized drive mechanism,
   wherein the motorized drive mechanism comprises a driving device adapted to drive a pinion engaged with a rack that is part of the first rail member, the second rail member being mounted so as to slide in the longitudinal direction relative to the driving device, and
   wherein the driving device cooperates with the lock control member by camming action to move the lock control member into the actuation position when the second rail member is moved from the neutral position with respect to the motorized drive mechanism.

2. The rail of claim 1, wherein the lock control member comprises a cam edge and the driving device comprises a pin which cooperates with the cam edge, the lock control member being movable substantially perpendicularly to the cam edge and being resiliently biased so that the cam edge is applied against the pin.

3. The rail of claim 2, wherein the cam edge has a notch adapted to engage the pin when the second rail member is in neutral position with respect to the motorized drive mechanism.

4. The rail of claim 3, wherein the cam edge comprises two substantially rectilinear portions that are in mutual alignment, one on each side of the notch.

5. The rail of claim 2, wherein the pin is mounted so as to slide in a slot that is part of the second rail member and extending in the longitudinal direction.

6. The rail of claim 5, wherein the pin is pivotally mounted in the rail and a retaining lever, which is integral with the driving device, is resiliently biased towards the rack so as to urge the pinion against the rack.

7. The rail of claim 6, wherein the lock control member is mounted so as to pivot relative to the second rail member about a pivot axis, and the retaining lever is resiliently biased towards the rack by a spring acting on a retaining cam mounted on the second rail member so as to pivot about the pivot axis, the spring connecting the retaining cam to the lock control member while biasing the lock control member towards the home position.

8. The rail of claim 7, wherein the lock control member extends longitudinally between a first end and a second end, the first end being mounted on the second rail member so as to pivot about the pivot axis and the second end being connected to the lock, the cam edge being located between the first end and the second end.

9. The rail of claim 1, wherein the lock comprises
   a lock body mounted so as to move between the locked position and the unlocked position along a transverse direction perpendicular to the longitudinal direction,
   and a plurality of locking pistons freely sliding independently of each other on the lock body in the transverse direction, the locking pistons being mutually aligned in the longitudinal direction and adapted to penetrate recesses that are part of the first rail member when the lock is in the locked position, each locking piston being biased towards the recesses of the first rail member.

10. A vehicle seat comprising a seating portion and two rails according to claim 1, the seating portion being carried by the second rail member of each rail.

* * * * *